United States Patent [19]
Moroto et al.

[11] Patent Number: 4,714,146
[45] Date of Patent: Dec. 22, 1987

[54] FRICTION COUPLING ELEMENT OF AUTOMATIC TRANSMISSION

[75] Inventors: Shuzo Moroto, Handa; Koji Sumiya, Nishio; Kazuaki Watanabe, Toyota; Seitoku Kubo, Toyota; Koji Kobayashi, Toyota; Yutaka Taga, Aichi, all of Japan

[73] Assignees: Aisin-Warner Limited, Anjo; Toyota Jidosha Kabushiki Kaisha, Toyota, both of Japan

[21] Appl. No.: 763,006

[22] Filed: Aug. 6, 1985

[30] Foreign Application Priority Data

Aug. 6, 1984 [JP] Japan ................................ 59-165513
Aug. 8, 1984 [JP] Japan ................................ 59-166960

[51] Int. Cl.$^4$ ...................... F16D 13/68; F16D 25/10; B60K 17/02
[52] U.S. Cl. .......................... 192/85 AA; 192/87.11; 192/87.15; 192/115
[58] Field of Search ............ 192/85 AA, 87.11, 87.15, 192/115; 74/758, 762, 782, 790; 403/DIG. 7; 411/517

[56] References Cited

U.S. PATENT DOCUMENTS

| 2,505,450 | 4/1950 | Wemp | 192/87.15 X |
| 2,946,241 | 7/1960 | Snyder | 192/87.15 X |
| 3,599,512 | 8/1971 | Wayman | 192/85 AA X |
| 3,772,940 | 11/1973 | Ohtsuka et al. | 192/87.15 X |
| 4,148,384 | 4/1979 | Stinson | 192/85 AA |
| 4,331,044 | 5/1982 | Bookout et al. | 74/762 X |
| 4,343,581 | 8/1982 | Millheiser | 411/517 |
| 4,380,179 | 4/1983 | Kubo et al. | 74/762 |
| 4,454,786 | 6/1984 | Stockton | 192/87.15 X |

FOREIGN PATENT DOCUMENTS

| 2159851 | 12/1971 | Fed. Rep. of Germany | 74/762 |
| 32460 | 3/1977 | Japan | 74/762 |

Primary Examiner—Rodney H. Bonck
Assistant Examiner—Richard M. Lorence
Attorney, Agent, or Firm—Spencer & Frank

[57] ABSTRACT

A support mechanism for friction coupling devices in an automatic transmission is disclosed.

A snap ring is mounted on a stationary or rotational member in an automatic transmission case and adapted to receive the operational load of one friction coupling device through an annular plate member.

A stepped portion is formed on the stationary or rotational member and adapted to receive the operational load of another friction coupling device through the annular plate member.

5 Claims, 18 Drawing Figures

FRICTION COUPLING ELEMENT OF AUTOMATIC TRANSMISSION

BACKGROUND OF THE INVENTION i. Field of the Invention:

This invention relates to a friction coupling device for a vehicular automatic transmission and a support mechanism for the friction coupling device.

ii. Description of the Prior Art:

The conventional support mechanism for a friction coupling device of an automatic transmission is usually constituted by a snap ring or a combination of a snap ring and a flange plate which are mounted on a stationary member such as the transmission case or on a rotational member, thereby to receive the operational load at the time of engagement of the friction coupling device.

In an automatic transmission in which a plural number of friction coupling devices are mounted in adjacent positions, however, the conventional support mechanism which consists of a snap ring or of a snap ring and a flange plate has a problem that the axial dimensions of the transmission are increased due to existence of a gap space between a hydraulic servo drum of one friction coupling device and a snap ring or a snap ring and a flange plate of an adjacent friction coupling device.

In addition, the conventional friction coupling device for automatic transmission employs a plural number of friction elements which are fitted in splines formed on a stationary or rotary member, in combination with a hydraulic servo drum which is formed integrally with the stationary or rotary member and which consists of an annular hydraulic servo drum having an outer cylinder, an inner cylinder and a side wall connecting the outer and inner cylinders, a piston fitted between the outer and inner cylinders, and return springs located outward of said outer cylinder or on a wall portion of the piston, engaging and releasing the friction coupling device by controlling flows of line pressure to and from a space between the drum and piston.

In a case where a number of friction coupling devices are mounted on a stationary member, in a row in the longitudinal direction and on one and the same circle, it is economical to form the splines on the part of the stationary member integrally according to the numbers of friction elements of the respective friction coupling devices. However, this is impossible since the hydraulic drums are formed integrally with the stationary member. Besides, when a friction coupling device is located at a distance from its hydraulic servo, the piston is required to have a long abutting surface for engagement with the friction elements along with a long side wall, lacking stability in rigidity and assemblage.

SUMMARY OF THE INVENTION

It is therefore an object of the present invention to provide a support mechanism for a friction coupling device of an automatic transmission, which can contribute to reduce axial demensions of the automatic transmission.

It is another object of the present invention to provide a friction coupling device for an automatic transmission, in which friction elements, hydraulic servo drums and pistons of friction coupling devices are fitted in splines formed on a stationary member successively in the longitudinal direction and on one and the same circle, thereby to facilitate positioning of these parts in the assembling stage and to ensure rigidity to the pistons.

Figure 1:
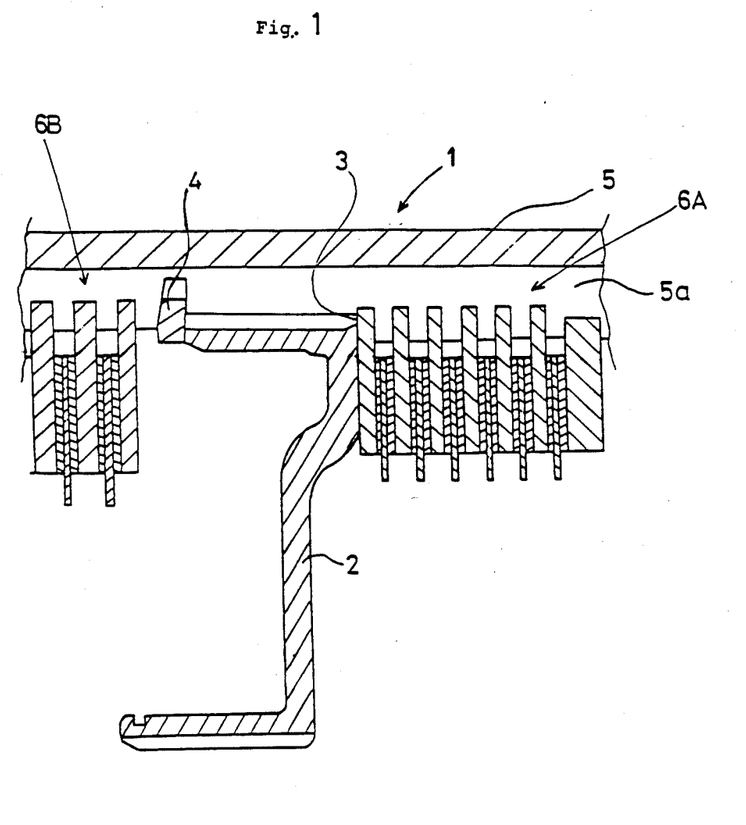
FIG. 1 is a schematic section of a friction coupling device support mechanism according to the present invention.

The support mechanism 1 for a friction coupling element of an automatic transmission, according to the invention, includes a snap ring 4 mounted on a stationary member 5a or a rotational member in an automatic transmission case 5 to receive the operational load of a friction coupling device 6A through an annular plate member 2, and a stepped portion 3 formed on the stationary member 5a or on a rotational member to receive the operational load of another friction coupling device 6B through the annular plate member 2.

The friction coupling device support mechanism with the above-described arrangement has a number of advantages as follows.

The operational loads of the two adjacent friction coupling devices are received by a stepped portion and a snap ring which are provided on a stationary or rotational member, so that it becomes possible to reduce the axial dimensions and weight of the automatic transmission.

Figure 3:
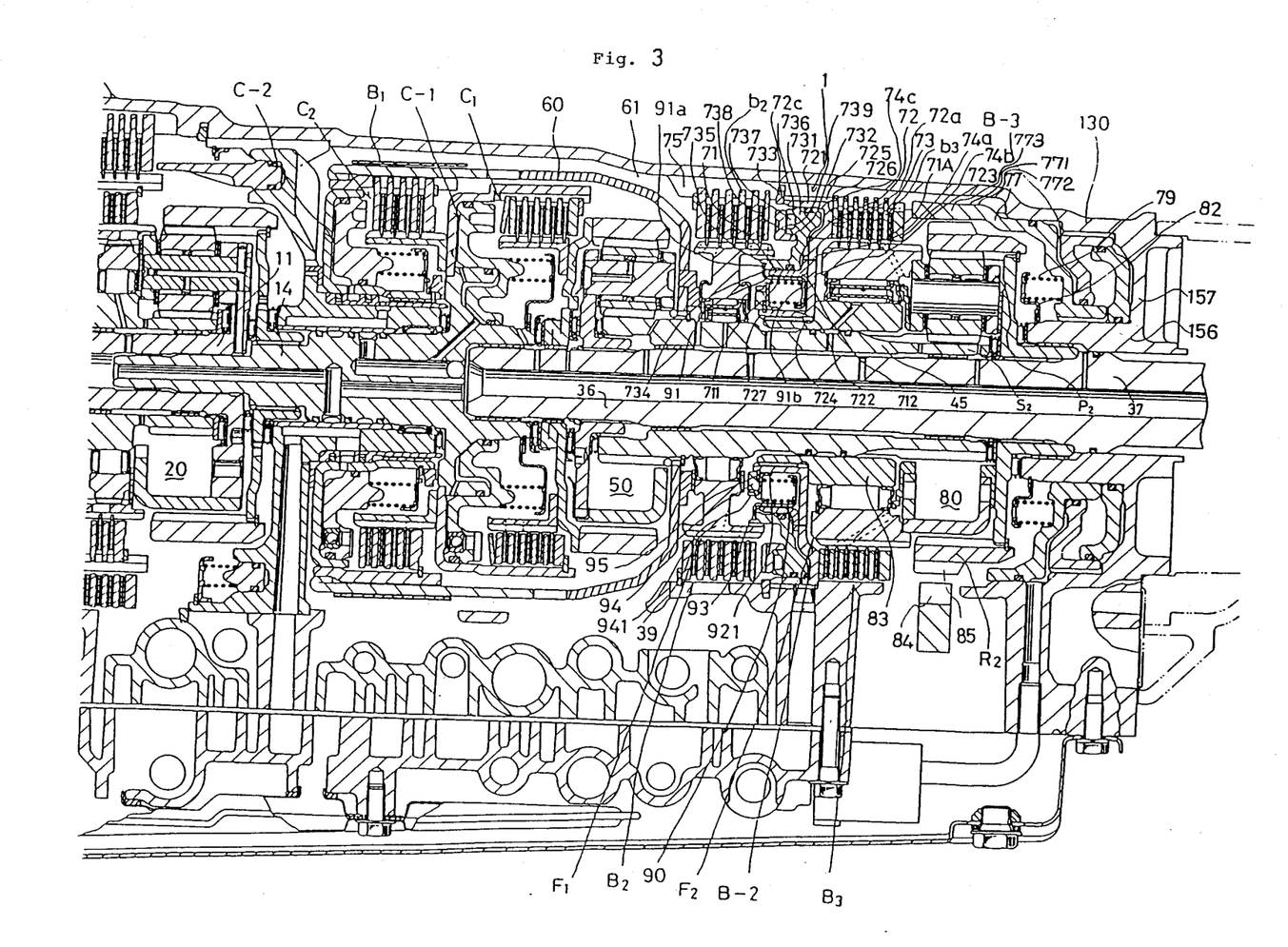
FIG. 3 is a schematic section showing major component parts of the automatic transmission of FIG. 2.

According to one aspect of the invention, the friction coupling device support of the present invention includes axially extending splines formed on a stationary or rotational member in an automatic transmission case, and successively engaged with a first friction coupling device, a hydraulic servo drum for the first friction coupling device and a second friction coupling device. According to another aspect of the invention, as shown in FIG. 3, the friction coupling device support of the invention includes an axially extending spline formed on a stationary or rotational member in an automatic transmission case, and successively engaged with a first friction coupling device, a hydraulic servo drum of the first friction coupling device, a second friction coupling device and a hydraulic servo piston of the second friction coupling device.

The following features and advantages accrue from the friction coupling device with the above-described construction according to the invention, in which splines are formed axially on a stationary or rotational member of an automatic transmission and successively engaged with a first friction coupling device, a hydraulic servo drum of the first friction coupling device and a second friction coupling device, and optionally with a hydraulic servo piston of the second friction coupling device.

(a) Friction coupling devices can be located successively in a longitudinal row in such a manner as to reduce the axial dimensions of the automatic transmission.

(b) Rigidity of the piston can be guaranteed.

The above and other objects, features and advantages of the invention will become apparent from the following description and the appended claims, taken in conjunction with the accompanying drawings which show by way of example one preferred embodiment of the invention.

DESCRIPTION OF PREFERRED EMBODIMENTS

Hereafter, the invention is described more particularly by way of the preferred embodiment shown in the drawings.

Figure 2:
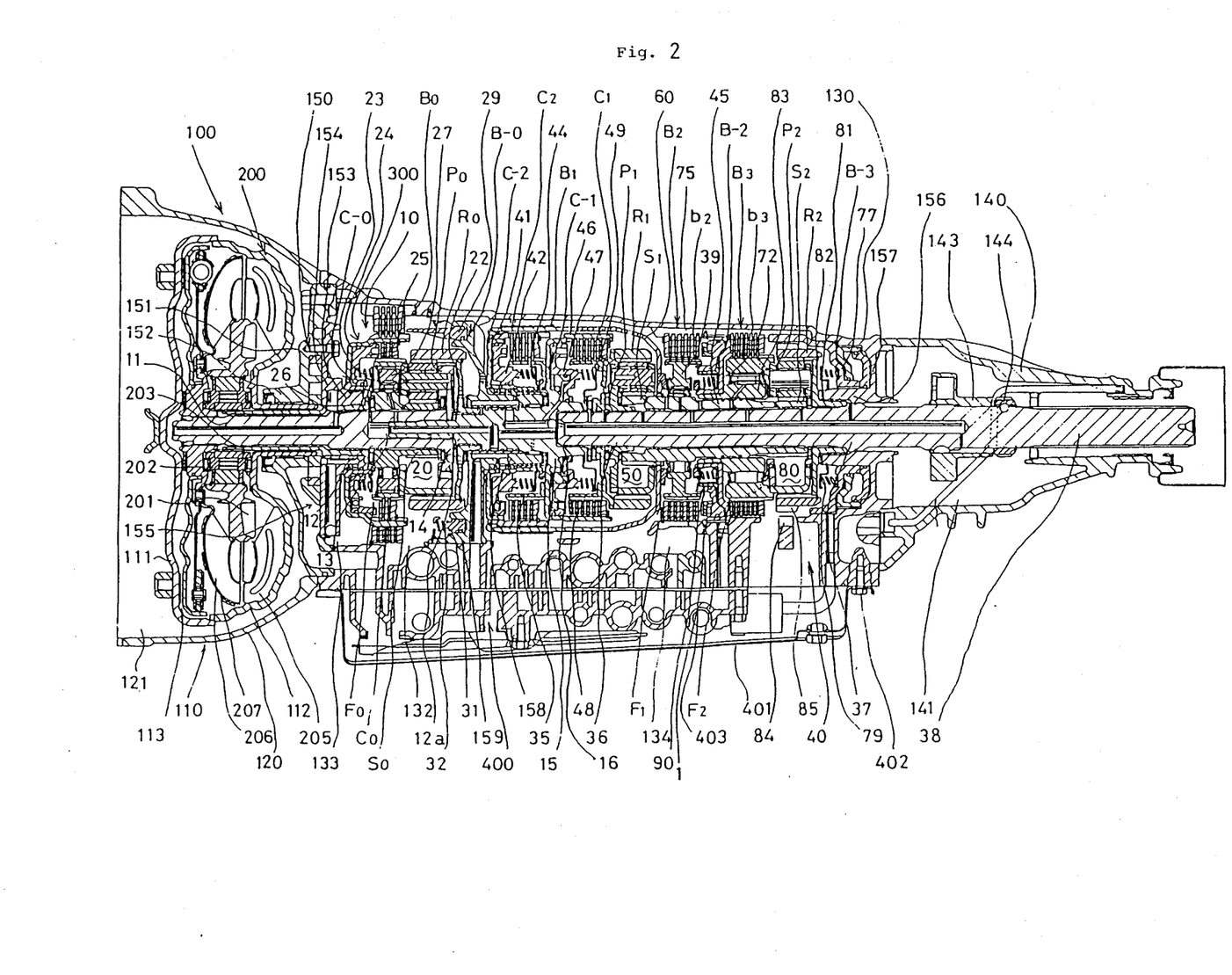
FIG. 2 is a schematic section of a vehicular automatic transmission incorporating the friction coupling device support mechanism according to the invention.

Referring to FIG. 2, the automatic transmission which is generally designated at 100, includes a fluid coupling 200 (a torque converter in the particular embodiment shown), a transmission 300, and a hydraulic control system 400.

The transmission 300 comprises: an overdrive planetary gear transmission 10 including a first planetary gear set 20, and multiple disk clutch CO, a multiple disk brake BO and a one-way clutch FO which are operated by hydraulic servos; and an underdrive planetary gear transmission 40 with three forward speed and one reverse speed ranges, including a second planetary gear set 50, a third planetary gear set 80, and two multiple disk clutches C1 and C2, a belt brake B1, two multiple disk brakes B2 and B3, and two one-way clutches F1 and F2 which are operated by hydraulic servoes.

The case 110 of the automatic transmission 100 includes: a torque converter housing 120 accommodating a torque converter 200; a transmission case 130 accommodating in series the overdrive planetary gear transmission 10 and the underdrive planetary gear transmission 40; and an extension housing 140 covering the rear side of the automatic transmission 100. The torque converter housing 120, transmission case 130 and extension housing 140 are fastened together by a number of bolts.

The torque converter 200 is received in a torque converter room 121 of the torque converter housing 120, which is open on the front side (on the side of the engine), and includes: a front cover 111 coupled with the output shaft of the engine; a rear cover 112 in the form of an annular plate welded at its outer periphery to the front cover 111; a pump impeller 205 provided on the inner wall around the inner periphery of the rear cover 112; a turbine runner 206 provided opposingly to the pump impeller 205; a turbine shell 207 retaining the turbine runner 206; a stator 201 supported on a fixed shaft 203 through a one-way clutch 202; and a direct coupling clutch (lock-up clutch) 113 for directly coupling the front cover 111 with the turbine shell 207. Mounted between the torque converter room 121 and a cylindrical transmission room 132 of the transmission case 130 ensuing on the rear side of the converter room 121 is a gear type oil pump 150 and an annular oil pump casing 151 which is centrally provided with a forwardly extending cylindrical portion 152 and fastened to the front end face of the transmission case 130 through a spigot fit. Fastened to the rear side of the oil pump body 151 is an oil pump cover 154 with a rearwardly extending cylindrical front support 153 in coaxial relation with the afore-mentioned cylindrical portion 152. The oil pump casing 151 and oil pump cover 154 form an oil pump housing 155 which serves as a partition wall between the torque converter room 121 and the transmission room 132 and also as a front support wall for the transmission 300. Provided at a median position in the transmission room 132 of the transmission case 130 is an intermediate support wall 159 which is formed separately by casting, the intermediate support wall 159 partitioning the overdrive room 133 and the underdrive room 134 from each other and being provided with a rearwardly extending cylindrical center support 158.

In a rear portion of the transmission case 130, a rear support wall 157 with a rearwardly extending cylindrical rear support 156 is formed integrally with the transmission case 130. Formed between the oil pump casing (the front support wall or partition wall) 155 and the rear support wall 157 is the transmission room 132 which receives the transmission 300, and formed between the rear support wall 157 and the extension housing 140 is an output shaft chamber 141 of the transmission. An electronically controlled sensor rotor 143 and a speedometer drive gear 144 are provided in the extension housing 140, and a sleeve yoke which is not shown is inserted in its rear end portion and coupled with a propeller shaft (not shown) in coaxial relation with the front support 153.

Rotatably supported in the front support 153, on the inner side of the fixed shaft 203, is an input shaft 11 of the transmission, which serves also as the output shaft of the torque converter 200. This input shaft 11 is formed in a larger diameter in its rear end portion 12 which is protruded rearward from the front support 11 and provided with a flange portion 12a, the rear end portion 12 being provided with a center hole 13 along its axis. An intermediate transmission shaft 14 is mounted rotatably in a position rearward of the input shaft 11 in series and coaxial relation therewith. The intermediate transmission shaft 14 is fitted in the center hole 13 at its fore end which is rotatable in sliding contact with the inner peripheral wall of the center hole 13 through a metal bearing, and formed in a larger diameter in its rear end portion 15 which is provided with a rearwardly opened center hole 16 along the axis thereof. An output shaft 36 is rotatably mounted rearward of and in series with the intermediate transmission shaft 14. This output shaft 36 is fitted in the center hole 16 at its fore end which is in sliding contact with the inner wall of the center hole 16 through a bush (metal bearing). The output shaft 36 is splined in its intermediate portion 37 with a flange plate 82 with a rearwardly projecting shaft portion 81 in meshing engagement with the ring gear R2 of the third planetary gear set 80, and in its rear portion 38 with the afore-mentioned sleeve yoke, fixedly mounting the sensor rotor 143 and speedometer drive gear 144 in the output shaft room 141.

The first planetary gear set 20 is mounted rearward of the input shaft 11 in the overdrive room 133, having a ring gear R0 coupled with the intermediate transmission shaft 14 through the flange plate 22, a planetary carrier P0 coupled with the flange portion 12a of the input shaft 11 and a sun gear S0 formed on the inner race shaft 23. A rearwardly opened first hydraulic servo drum 24 is fixedly mounted on the inner race shaft 23 on the front side of the first planetary gear set 20, and an annular piston 25 is fitted between the outer peripheral wall of the drum and the inner race shaft 23 to form a hydraulic servo C-0 for the clutch C0, mounting a return spring 26 on the side of the inner race shaft 23 and the clutch C0 on the inner side of the outer peripheral wall and coupling with the planetary carrier P0 through the clutch C0. A one-way clutch F0 having the inner race shaft 23 as its inner race is provided on the inner periphery of the first hydraulic servo drum 24 and, between an outer race 27 on its outer periphery and the transmission case 130, the clutch C0 and brake B0 are provided. A piston 29 is fitted on the front side of the center support wall 159 to form a hydraulic servo B-0 for the brake B0, and a return spring 32 is fitted in the inner periphery 31 of a fore end portion of the intermediate support wall 159.

A rearwardly opened second hydraulic servo drum 41 is rotatably fitted on the center support 159 in a front portion of the underdrive room 134, and an annular piston 42 is fitted between its inner and outer peripheral walls to form a hydraulic servo C-2 for the clutch C2, mounting a return spring 44 on the side of the inner peripheral wall and the clutch C2 on the side of the outer peripheral wall. Behind the second hydraulic servo drum 41, a rearwardly opened third hydraulic servo drum 46 with an annular projection 35 on its front side is fixedly mounted on a rear end portion 15 of the intermediate transmission shaft 14. An annular piston 47 is fitted between the just-mentioned rear end portion 15 and the outer peripheral wall to form a hydraulic servo C-1 for the clutch C1, mounting a return spring 49 on the inner peripheral side of the clutch C1 and mounting the clutch C2 on the outer periphery of the annular projection 35. The second and third hydraulic servo drums 41 and 46 are coupled through the clutch C2. Provided behind the third hydraulic servo drum 46 is the second planetary gear set 50 having its ring gear R1 coupled with the third hydraulic servo drum 46 through the annular projection 48 and clutch C1, a planetary carrier P1 splined with a fore end portion of the output shaft 36, and a sun gear S1 formed integrally with the sun gear shaft 45. A connecting drum 60 which is so shaped as to cover the second and third hydraulic drums 41 and 46 and the second planetary gear set 50 in a minimum space is fixed at its fore end to the outer periphery of the second hydraulic servo drum 41, and connected at its rear end to the sun gear shaft 45 at a position behind the second planetary gear set 50, with a belt brake B1 on the outer periphery thereof.

As shown also in FIG. 3, brake disks b2 of the brake B2, outer spline 725 of an annular member or fourth hydraulic servo drum 72 and brake disks b3 of the brake B3 are fitted from the front side in spline 75 which is formed on the inner side of the transmission case 130 behind the brake B2, and a piston 77 is fitted in an annular hole between the outer periphery of the rear support 156 of the support wall 157 and the transmission case 130 to form a hydraulic servo B-3 for the brake B3, supporting the return spring 79 of the hydraulic servo B-3 by a flange plate 82 which is mounted at the fore end of the rear support 156. The piston 77 has a sleeve portion 773, the outer peripheral portion 771 of which is provided with ribs 772 which are engaged with the spline 75.

Provided on the inner side of the brake B2 is a one-way clutch F1 which uses the sun gear shaft 45 as its inner race and has its outer race 39 connected to the brake B2. Mounted behind the one-way clutch F1 is a return biasing means 90 and a one-way clutch F2 having its inner race 83 splined to the fourth hydraulic servo drum 70. The third planetary gear set 80 has a sun gear S2 formed integrally with the sun gear shaft 45, a carrier P2 coupled with the outer race 86 of the forwardly located clutch F2 and with the brake B3, and a ring gear R2 provided with a parking gear 85 around the circumference thereof and coupled with an intermediate portion 37 of the output shaft 36. When the shiftlever of the automatic transmission is set in "parking" (P) position, the parking gear 85 is meshed with a parking pawl 84 to fix the output shaft 36.

Figure 4:
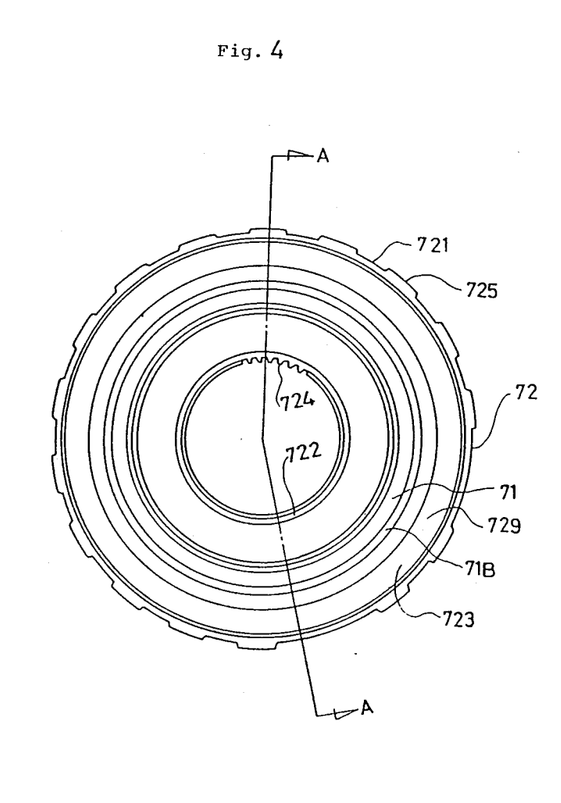
FIG. 4 is a front view of a hydraulic servo drum employed by the support mechanism of the invention for a friction of the automatic transmission.
Figure 5:
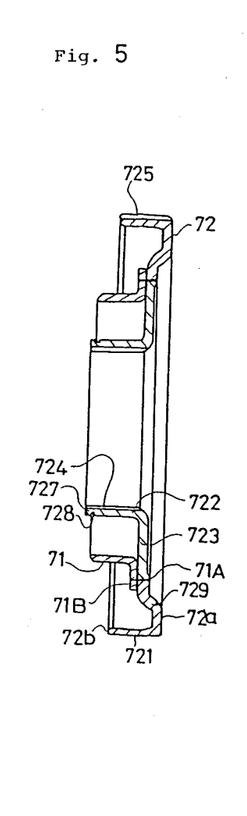
FIG. 5 is a schematic section taken on line A—A of FIG. 4.
Figures 6, 7, 9:
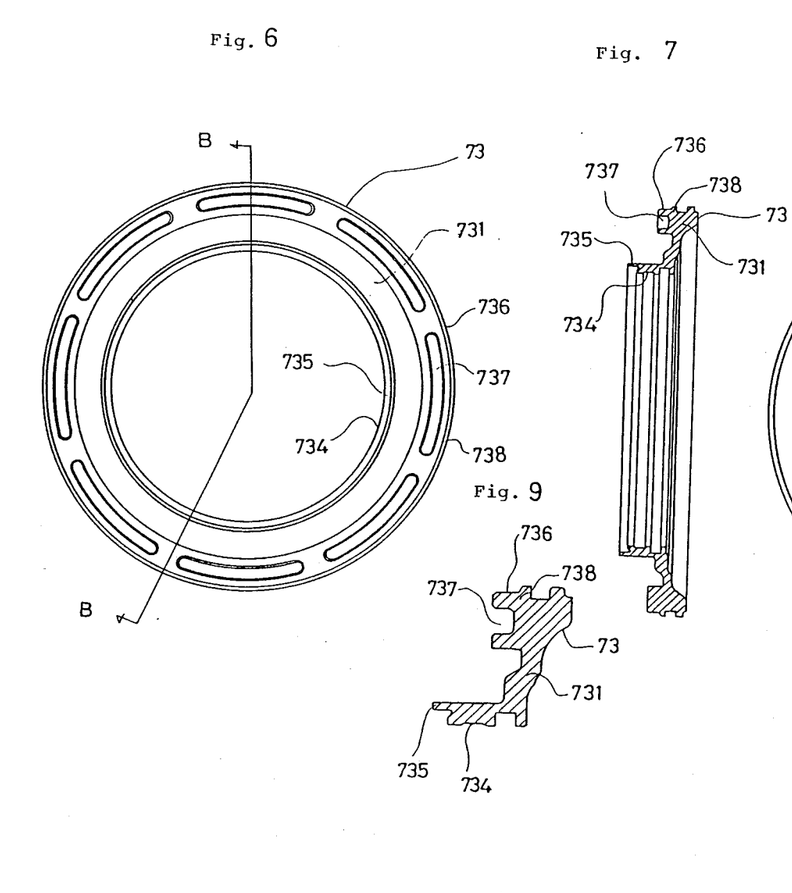
FIG. 6 is a front view of a piston.
FIG. 7 is a schematic section taken on line B—B of FIG. 6.
FIG. 9 is a sectional view of the piston.
Figure 8:
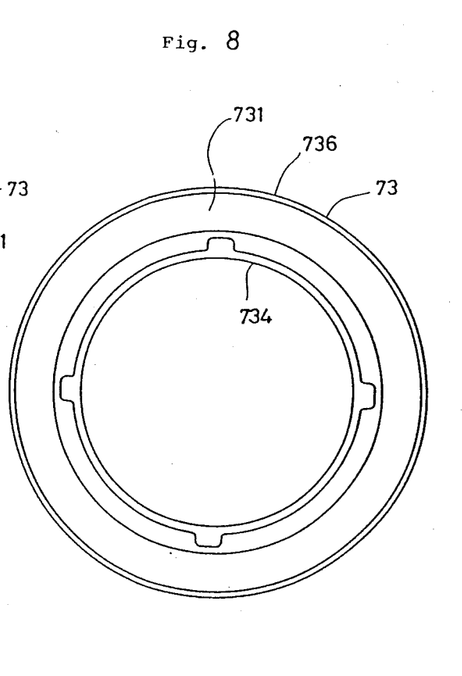
FIG. 8 is another view in section of the piston.
Figures 10, 11, 12:
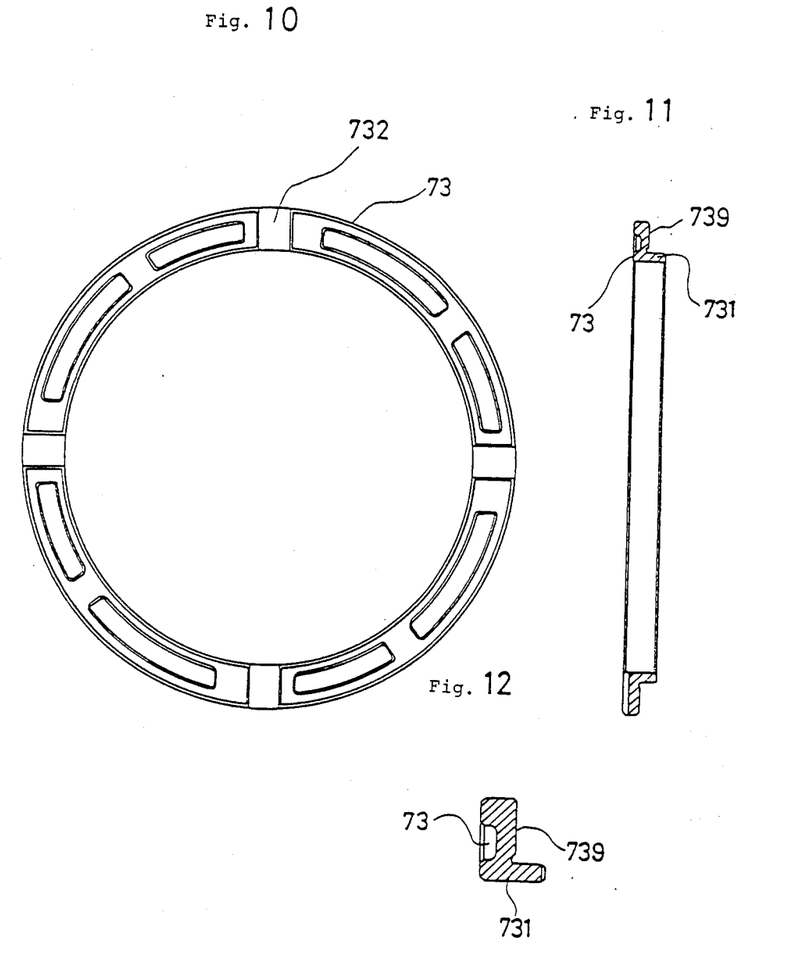
FIG. 10 is a sectional view of an adaptor sleeve.
FIG. 11 is a front view of the adaptor sleeve of FIG. 10.
FIG. 12 is a sectional view of the adaptor sleeve.
Figure 13:
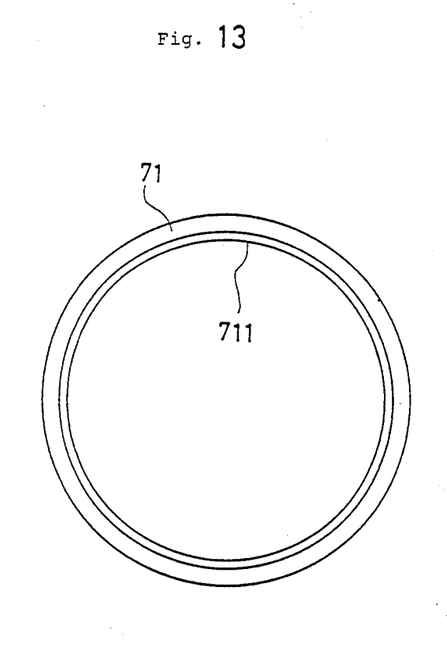
FIG. 13 is a front view of an intermediate cylinder of the friction coupling device support mechanism according to the invention.
Figure 14:
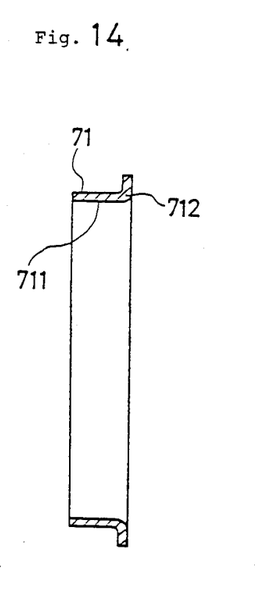
FIG. 14 is a sectional view of the intermediate cylinder member of FIG. 13.
Figure 15:
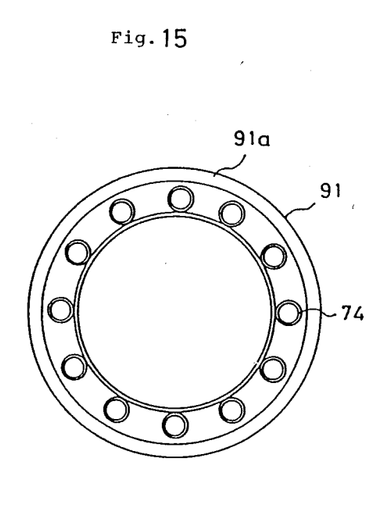
FIG. 15 is a front view of a connector member and a return spring employed in the support mechanism of the invention.
Figure 16:
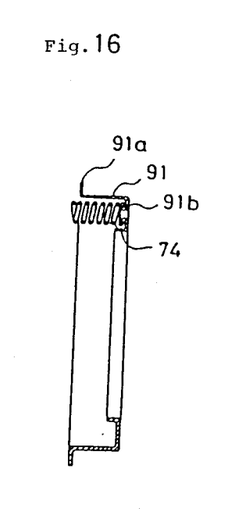
FIG. 16 is a sectional view of the connector and return spring of FIG. 15.
Figure 17:
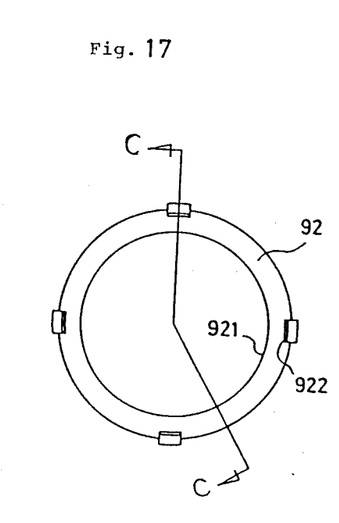
FIG. 17 is a front view of a retainer in the friction coupling device support mechanism of the invention.
Figure 18:
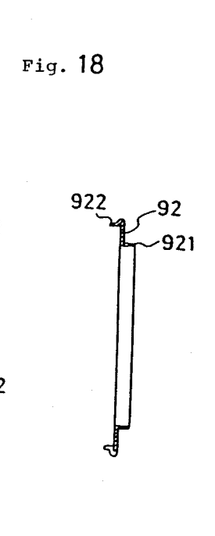
FIG. 18 is a section taken on line C—C of FIG. 17.

The friction coupling device support mechanism 1 of the invention includes: a snap ring 733 in the form of a tapered ring which is mounted on the transmission case 130 to receive through the fourth hydraulic servo drum 72 the operational load of the brake B3 which constitutes one friction coupling device; and a stepped portion 726 formed on the transmission case 130 to receive through the fourth hydraulic servo drum 72 the operational load of the brake B2 which constitutes the other friction coupling device. The fourth hydraulic servo drum 72 is mounted in an extra space 61 behind the connecting drum 60 on the outer side of the second planetary gear set 50. As shown in FIGS. 4 and 5, the fourth hydraulic servo drum 72 includes an outer cylinder 721, an inner cylinder 722 and a side wall 723 connecting the two cylinders and serving as a reaction plate for the return springs which will be described hereinlater, and being formed into U-shape in section by press-forming, with an outer spline 725 provided on the outer periphery of outer cylinder 721 for splined engagement with the transmission case 130. The drum 72 is fixed to the transmission case 130 in the rotational direction by the outer spline 725 and fixed in the axial direction by the snap ring 733 on one side of the drum and the stepped portion 726 formed on the transmission case 130 on the other side of the drum. The intermediate cylinder 71 similarly is joined to the fourth hydraulic servo drum 72 by welding 71A to prevent leaks of oil pressure from the hydraulic servo. As shown in FIGS. 6 to 9, a piston 73 is fitted between the fourth hydraulic servo drum 72 and the intermediate cylinder 71 which is projected from a predetermined position on the drum 72 to form a hydraulic servo B-2 for the brake B2, the piston 73 including a piston body 731 having a connecting member, which will be described hereinlater, secured to one end face 735 of the inner peripheral wall 734 of its one end portion 738, and an adaptor sleeve 732 (FIGS. 10 to 12) covering the end portion 738 of the piston body 731 with the rear side 739 of an L-shaped wall. This piston construction facilitates assembling of the snap ring 733 which fixes the fourth hydraulic servo drum 72 to the transmission case 130, and the intermediate cylinder 71 defines an area of a suitable diameter for the piston 73.

As shown also in FIGS. 13 to 18, the return biasing means 90 includes: a connecting member 91 having one end 91a thereof secured to the end face 735 of the inner periphery 734 of the piston 73 and the other end 91b folded to extend along the inner periphery 711 of the intermediate cylinder 71 and around the other end 712 thereof; a retainer 92 having one end 922 thereof secured to one end 727 of the inner cylinder 722 and the other end 922 folded into engagement with the outer periphery of a ring 94 which is fixed in position by a snap ring 95 fixed on one end 727 of the inner cylinder 722; and return springs 93 interposed between the connecting member 91 and retainer 92.

The transmission 300 engages or releases the respective clutches and brakes by the oil pressure which is selectively supplied to the hydraulic servoes of the friction coupling elements according to the vehicle speed, throttle opening or other operating conditions of the vehicle by the hydraulic control system 400 in a valve casing 403 in an oil pan 401 which is fastened to the lower side of the transmission case 130 by bolts 402, thereby effecting shifts to and from four forward and one reverse speed ranges. Table 1 below shows one example of speed ranges established by engagement and release of the respective clutches, brakes and one-way clutches.

TABLE 1

| RANGES | | Clutches | | | Brakes | | | | OWC | | |
|---|---|---|---|---|---|---|---|---|---|---|---|
| | | $C_0$ | $C_1$ | $C_2$ | $B_0$ | $B_1$ | $B_2$ | $B_3$ | $F_0$ | $F_1$ | $F_2$ |
| P | | E | X | X | X | X | X | X | f | f | f |
| R | | E | X | E | X | X | X | E | f | f | f |
| N | | E | X | X | X | X | X | X | f | f | f |
| D | 1 | E | E | X | X | X | X | X | (L) | f | L |
| | 2 | E | E | X | X | X | E | X | (L) | L | f |
| | 3 | E | E | E | X | X | E | X | (L) | f | f |
| | 4 | X | E | E | E | X | E | X | f | f | f |
| S | 1 | E | E | X | X | X | X | X | (L) | f | L |
| | 2 | E | E | X | X | E | E | X | (L) | (L) | f |
| | 3 | E | E | E | X | X | E | X | (L) | f | f |
| | (3) | E | E | E | X | X | E | X | (L) | f | f |
| L | 1 | E | E | X | X | X | X | E | (L) | f | (L) |
| | 2 | E | E | X | X | E | E | X | (L) | (L) | f |
| | (1) | E | E | X | X | X | X | E | (L) | f | (L) |

In Table 1, the letter "E" indicates an engaged state of the corresponding clutch or brake, and "L" indicates that the corresponding one-way clutch is engaged only in engine-drive operation and not in engine-brake operation. Further, the letter "(L)" indicates a "locked" state in which the corresponding one-way clutch is engaged in engine-drive operation but its engagement is not necessarily required since the power is delivered by a parallelly mounted clutch or brake. The small letter "f" indicates a free state of the corresponding one-way clutch, and the cross "X" indicates a released state of the corresponding clutch or brake.

What is claimed is:

1. In an automatio transmission with a stationary or rotational member; a first friction coupling device for selectively engaging a first rotatable member to the stationary or rotational member and having a first friction element engaged with an axially extending internal spline formed on the stationary or rotational member, and a first hydraulic servo producing an operational load; and a second friction coupling device for selectively engaging a second rotatable member to the stationary or rotational member and having a second friction element engaged with said spline formed on the stationary or rotational member, and a second hydraulic servo producing an operational load, said first and second friction coupling devices being mounted in the stationary or rotational member in a longitudinal direction; a support mechanism for said friction coupling devices comprising:
   a hydraulic servo drum having an outer cylinder engaged with said spline formed on the stationary or rotational member, a side wall connected to said outer cylinder and an inner cylinder connected to said side wall to form said second hydraulic servo;
   a snap ring mounted on said stationary or rotational member at one side of said hydraulic servo drum and adapted to receive the operational load of said first friction coupling device through said hydraulic servo drum, said snap ring being in the form of a tapered ring; and
   a stepped portion formed on said stationary or rotational member at the other side of said hydraulic servo drum and adapted to receive the operational load of said second friction coupling device through said hydraulic servo drum.

2. A support mechanism for friction coupling devices in an automatic transmission according to claim 1, wherein said second hydraulic servo includes a piston fitted in said hydraulic servo drum and having a piston body and an adapter sleeve covering an end portion of said piston body.

3. A friction coupling means for an automatic transmission, comprising:
   a stationary or rotational member;
   a first friction coupling device for selectively engaging a first rotatable member to said stationary or rotational member and including a first friction element fitted in said stationary or rotational member and a first hydraulic servo producing an operational load;
   a second friction coupling device for selectively engaging a second rotatable member to said stationary or rotational member and including a second friction element fitted in said stationary or rotational member and a second hydraulic servo producing an operational load; said second hydraulic servo having a hydraulic servo drum;
   said stationary or rotationl member including an axially extending inner spline engaged with said first friction element, said hydraulic servo drum and said second friction element;
   a snap ring mounted on said stationary or rotational member at one side of said hydraulic servo drum to receive the operational load of said first fricction coupling device through said hydraulic servo drum; and
   a stepped portion formed on said stationary or rotational member at the other side of said hydraulic servo drum to receive the operational load of said second friction coupling device through said hydraulic servo drum.

4. A friction coupling means for an automatic transmission according to claim 3 wherein said first hydraulic servo has a piston provided with ribs on the outer periphery thereof for engagement with said axially extending inner spline of said stationary or rotational member.

5. A friction coupling means for an automatic transmission according to claim 3, wherein said snap ring is in the form of a tapered ring.

* * * * *